(12) United States Patent
Zhang et al.

(10) Patent No.: US 12,146,583 B2
(45) Date of Patent: Nov. 19, 2024

(54) LATCHING VALVE

(71) Applicant: LEGGETT & PLATT CANADA CO., Halifax (CA)

(72) Inventors: Jianlin Zhang, Windsor (CA); Milosz Niec, Tecumseh (CA); Renato Colja, Windsor (CA)

(73) Assignee: Leggett & Platt Canada Co., Halifax (CA)

( * ) Notice: Subject to any disclaimer, the term of this patent is extended or adjusted under 35 U.S.C. 154(b) by 161 days.

(21) Appl. No.: 17/633,901

(22) PCT Filed: Aug. 7, 2020

(86) PCT No.: PCT/CA2020/000098
§ 371 (c)(1),
(2) Date: Feb. 8, 2022

(87) PCT Pub. No.: WO2021/026630
PCT Pub. Date: Feb. 18, 2021

(65) Prior Publication Data
US 2022/0290774 A1    Sep. 15, 2022

Related U.S. Application Data

(60) Provisional application No. 62/884,885, filed on Aug. 9, 2019.

(51) Int. Cl.
| | | |
|---|---|---|
| *F16K 31/08* | (2006.01) | |
| *B60N 2/66* | (2006.01) | |
| *F16K 11/044* | (2006.01) | |

(52) U.S. Cl.
CPC .......... *F16K 31/084* (2013.01); *B60N 2/665* (2015.04); *F16K 11/044* (2013.01)

(58) Field of Classification Search
CPC ...... F16K 31/084; F16K 11/044; B60N 2/665
See application file for complete search history.

(56) References Cited

U.S. PATENT DOCUMENTS

| | | |
|---|---|---|
| 3,203,447 A | 8/1965 | Bremner et al. |
| 3,442,483 A | 5/1969 | Schwartz |
| 4,529,214 A | 7/1985 | Stoll et al. |
| 4,548,041 A | 10/1985 | Taylor |

(Continued)

FOREIGN PATENT DOCUMENTS

| | | |
|---|---|---|
| CA | 2435356 A1 | 1/2001 |
| CN | 1277661 A | 12/2000 |

(Continued)

OTHER PUBLICATIONS

G.Rau Innovative Metalle, "Thermal Actuators", 12 pages, retrieved Apr. 7, 2019.

(Continued)

*Primary Examiner* — Anthony D Barfield
(74) *Attorney, Agent, or Firm* — Michael Best & Friedrich LLP

(57) ABSTRACT

A pneumatic valve includes a housing, a first port, a second port, and a third port, each in communication with an interior of the housing, a coil assembly coupled to the housing, a plunger axially movable within the housing between a first position and a second position in response to electrical current being driven through the coil assembly, and a permanent magnet configured to retain the plunger in at least one of the first position or the second position.

19 Claims, 6 Drawing Sheets

(56) References Cited

U.S. PATENT DOCUMENTS

| | | | |
|---|---|---|---|
| 4,630,799 A | 12/1986 | Nolan et al. |
| 4,674,398 A | 6/1987 | Taylor |
| 4,736,587 A | 4/1988 | Suzuki |
| 4,903,732 A | 2/1990 | Allen |
| 4,922,965 A | 5/1990 | Meister |
| 4,973,024 A | 11/1990 | Homma |
| 5,148,833 A | 9/1992 | Ota |
| 5,211,371 A | 5/1993 | Coffee |
| 5,904,712 A | 5/1999 | Axelgaard |
| 6,098,000 A | 8/2000 | Long et al. |
| 6,203,105 B1 | 3/2001 | Rhodes, Jr. |
| 6,499,509 B2 | 12/2002 | Berger et al. |
| 7,744,059 B2 | 6/2010 | Jerg |
| 7,815,161 B2 | 10/2010 | Saitoh et al. |
| 8,499,779 B2 | 8/2013 | Gillespie |
| 8,629,745 B2 | 1/2014 | Sturman et al. |
| 8,784,080 B2 | 7/2014 | Dorfler et al. |
| 8,794,707 B2 | 8/2014 | Bocsanyi et al. |
| 9,080,581 B2 | 7/2015 | Bocsanyi et al. |
| 9,186,853 B2 | 11/2015 | Khan et al. |
| 9,797,521 B1 | 10/2017 | Davis |
| 9,945,490 B2 | 4/2018 | Dankbaar et al. |
| 9,951,765 B2 | 4/2018 | Ki et al. |
| 10,066,756 B2 | 9/2018 | Sohn |
| 10,107,279 B2 | 10/2018 | Dankbaar et al. |
| 10,107,410 B2 | 10/2018 | Dankbaar et al. |
| 10,207,619 B2 | 2/2019 | Dankbaar et al. |
| 10,290,876 B2 | 5/2019 | Prieto et al. |
| 10,378,677 B2 | 8/2019 | Kuszneruk et al. |
| 10,753,494 B2 | 8/2020 | Beuschel et al. |
| 10,948,097 B2 | 5/2021 | Dorfler et al. |
| 11,073,219 B2 | 7/2021 | Dorfler et al. |
| 2002/0112788 A1 | 8/2002 | Tanaka et al. |
| 2003/0178074 A1 | 9/2003 | Itzhaky |
| 2003/0183289 A1 | 10/2003 | Seuret et al. |
| 2005/0005980 A1 | 1/2005 | Eberhardt et al. |
| 2005/0024174 A1 | 2/2005 | Kolb et al. |
| 2005/0139610 A1 | 6/2005 | Crossdale et al. |
| 2005/0139796 A1 | 6/2005 | Altonji |
| 2005/0263196 A1 | 12/2005 | Hsieh |
| 2007/0023089 A1 | 2/2007 | Beyerlein et al. |
| 2007/0113906 A1 | 5/2007 | Sturman et al. |
| 2008/0271559 A1 | 11/2008 | Garscha et al. |
| 2010/0139785 A1 | 6/2010 | Saitoh et al. |
| 2011/0095216 A1 | 4/2011 | Degreef et al. |
| 2012/0067430 A1 | 3/2012 | Deperraz et al. |
| 2012/0143108 A1 | 6/2012 | Bocsanyi et al. |
| 2012/0153043 A1 | 6/2012 | Arekar et al. |
| 2012/0199763 A1 | 8/2012 | Lind |
| 2012/0199768 A1 | 8/2012 | Love et al. |
| 2014/0103232 A1 | 4/2014 | Deperraz |
| 2014/0191549 A1 | 7/2014 | Hermansson |
| 2014/0232155 A1 | 8/2014 | Bocsanyi et al. |
| 2015/0028234 A1 | 1/2015 | Kraus et al. |
| 2016/0018016 A1 | 1/2016 | Dankbaar et al. |
| 2016/0153575 A1 | 6/2016 | Sohn |
| 2016/0207075 A1 | 7/2016 | Alexander et al. |
| 2017/0025784 A1 | 1/2017 | Greene |
| 2017/0097104 A1 | 4/2017 | Deperraz |
| 2018/0023906 A1 | 1/2018 | Tajiri et al. |
| 2018/0038514 A1 | 2/2018 | Kusneruk et al. |
| 2018/0283571 A1 | 10/2018 | Miyazoe et al. |
| 2018/0306212 A1 | 10/2018 | Weickel et al. |
| 2018/0363642 A1 | 12/2018 | Salih et al. |
| 2019/0003609 A1 | 1/2019 | Asai et al. |
| 2019/0049026 A1 | 2/2019 | Beuschel et al. |
| 2019/0049033 A1 | 2/2019 | Mitzler et al. |
| 2019/0107214 A1 | 4/2019 | Kruppe et al. |
| 2019/0116681 A1 | 4/2019 | De Carolis et al. |
| 2019/0118690 A1 | 4/2019 | Beuschel et al. |
| 2019/0120402 A1 | 4/2019 | Jamison et al. |
| 2019/0195246 A1 | 6/2019 | Jamison et al. |
| 2019/0353268 A1 | 11/2019 | Dorfler et al. |
| 2019/0353270 A1 | 11/2019 | Dorfler et al. |
| 2020/0088314 A1 | 3/2020 | Samain et al. |
| 2020/0103047 A1 | 4/2020 | Beuschel et al. |
| 2020/0287322 A1 | 9/2020 | Dörfler et al. |
| 2020/0347833 A1 | 11/2020 | Dankbaar et al. |
| 2020/0378516 A1 | 12/2020 | Beuschel et al. |
| 2021/0018109 A1 | 1/2021 | Beuschel et al. |
| 2022/0205551 A1 | 6/2022 | Nicola et al. |
| 2022/0243827 A1 | 8/2022 | Nicola et al. |

FOREIGN PATENT DOCUMENTS

| | | |
|---|---|---|
| CN | 2526615 Y | 12/2002 |
| CN | 101095000 A | 12/2007 |
| CN | 101922578 B | 11/2011 |
| CN | 103991396 A | 8/2014 |
| CN | 105465090 A | 4/2016 |
| CN | 108953683 A | 12/2018 |
| CN | 109318770 A | 2/2019 |
| DE | 4117958 A1 | 12/1992 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102012011975 B4 | 9/2018 |
| DE | 102017107073 A1 | 10/2018 |
| DE | 102017217213 B3 | 3/2019 |
| DE | 102018200635 A1 | 7/2019 |
| EP | 0333452 A2 | 9/1989 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830394 A | 3/1960 |
| GB | B30393 A | 3/1960 |
| GB | 971816 A | 10/1964 |
| JP | 4091035 B2 | 5/2008 |
| WO | 2004104462 A1 | 12/2004 |
| WO | 2012159689 A1 | 11/2012 |
| WO | 2014135909 A1 | 9/2014 |
| WO | 2015185132 A | 12/2015 |
| WO | 2018005528 A1 | 1/2018 |
| WO | 2018049526 A1 | 3/2018 |
| WO | 2018065217 A1 | 4/2018 |
| WO | 2019149498 A1 | 8/2019 |
| WO | 2019218072 A1 | 11/2019 |

OTHER PUBLICATIONS

International Search Report and Written Opinion for Application No. PCT/CA2020/000098 dated Nov. 3, 2020 (9 pages).
International Preliminary Report on Patentability for Application No. PCT/CA2020/000098 dated Feb. 8, 2022 (7 pages).
Chinese Patent Office Action for Application No. 202080056273.1 dated Jan. 9, 2024 (20 pages including English translation).
Chinese Patent Office Action for Application No. 202080056273.1 dated Aug. 23, 2024 (16 pages including English translation).

LATCHING VALVE

CROSS-REFERENCE TO RELATED APPLICATIONS

The application is a national phase of International Patent Application No. PCT/CA2020/000098, filed on Aug. 7, 2020, which claims priority to U.S. Provisional Patent Application No. 62/884,885, filed Aug. 9, 2019, the entire content of each of which is incorporated herein by reference.

FIELD OF THE INVENTION

The present invention relates to valves, and more particularly to latching valves.

BACKGROUND

Many electronically-actuated valves require continuous application of current from a power source to remain in an actuated position against the force of a biasing member. The biasing member returns the valve to its unactuated or neutral position when the power source is de-energized. Thus, maintaining the valve in the actuated position for an extended period of time may draw a significant amount of power from the power source, leading to inefficiency and undesirable heating of the actuator.

SUMMARY

The invention provides, in one aspect, a pneumatic valve including a housing, a first port, a second port, and a third port, each in communication with the housing, a coil assembly coupled to the housing, a plunger axially movable within the housing between a first position and a second position in response to electrical current being driven through the coil assembly, and a permanent magnet configured to retain the plunger in at least one of the first position or the second position.

The invention provides, in another aspect, a pneumatic valve including a housing having a first port, a coil assembly coupled to the housing, a plunger axially movable within the housing between a first position and a second position in response to electrical current being driven through the coil assembly, and a permanent magnet configured to retain the plunger in at least one of the first position or the second position. The plunger is configured to open the first port when the plunger is in the first position, and the first port is configured to be closed when the plunger is in the second position.

The present invention provides, in another aspect, a vehicle seating system including a seat, an inflatable bladder disposed within the seat, a power source, an air pump electrically coupled to the power source, and a valve operable to control inflation and deflation of the bladder. The bladder includes a housing, a pressure port fluidly coupled to the air pump, a bladder port fluidly coupled to the inflatable bladder, a vent port, a coil assembly coupled to the housing and electrically coupled to the power source, a plunger axially movable within the housing between a first position and a second position in response to electrical current being driven through the coil assembly, and a permanent magnet configured to retain the plunger in at least one of the first position or the second position. The plunger is configured to open the pressure port when the plunger is in the first position, and the plunger is configured to open the vent port when the plunger is in the second position.

Other features and aspects of the invention will become apparent by consideration of the following detailed description and accompanying drawings.

Figure 1:
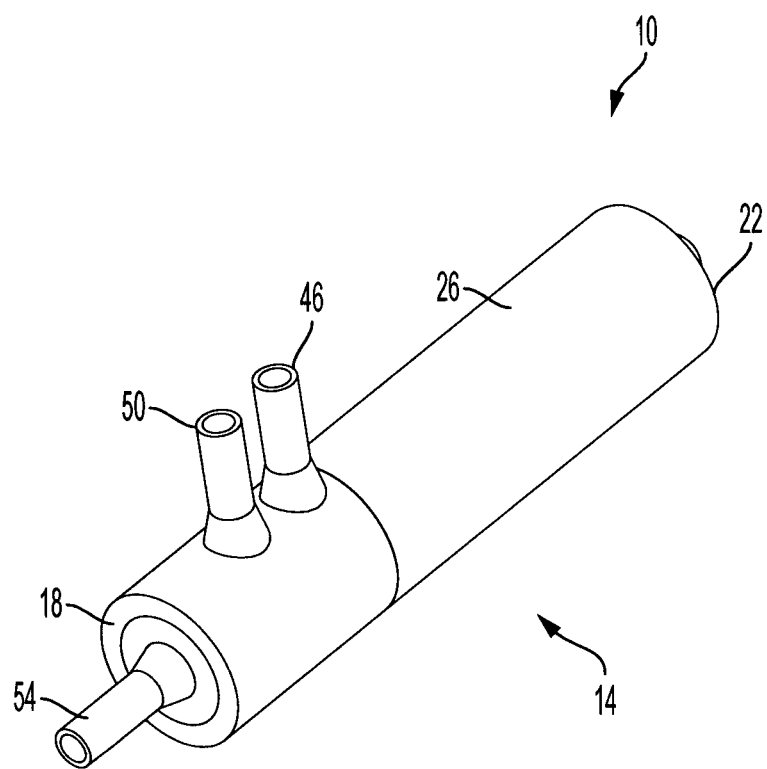
FIG. 1 is a perspective view of a valve according to one embodiment of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-3B illustrates a valve 10 according to an embodiment of the present disclosure. The valve 10 includes a generally cylindrical housing 14 having a first end wall 18, a second end wall 22 opposite the first end wall 18, and a side wall 26 extending between the first and second end walls 18, 22. In other embodiments, the housing 14 may have other shapes to suit a particular application.

Figure 2:
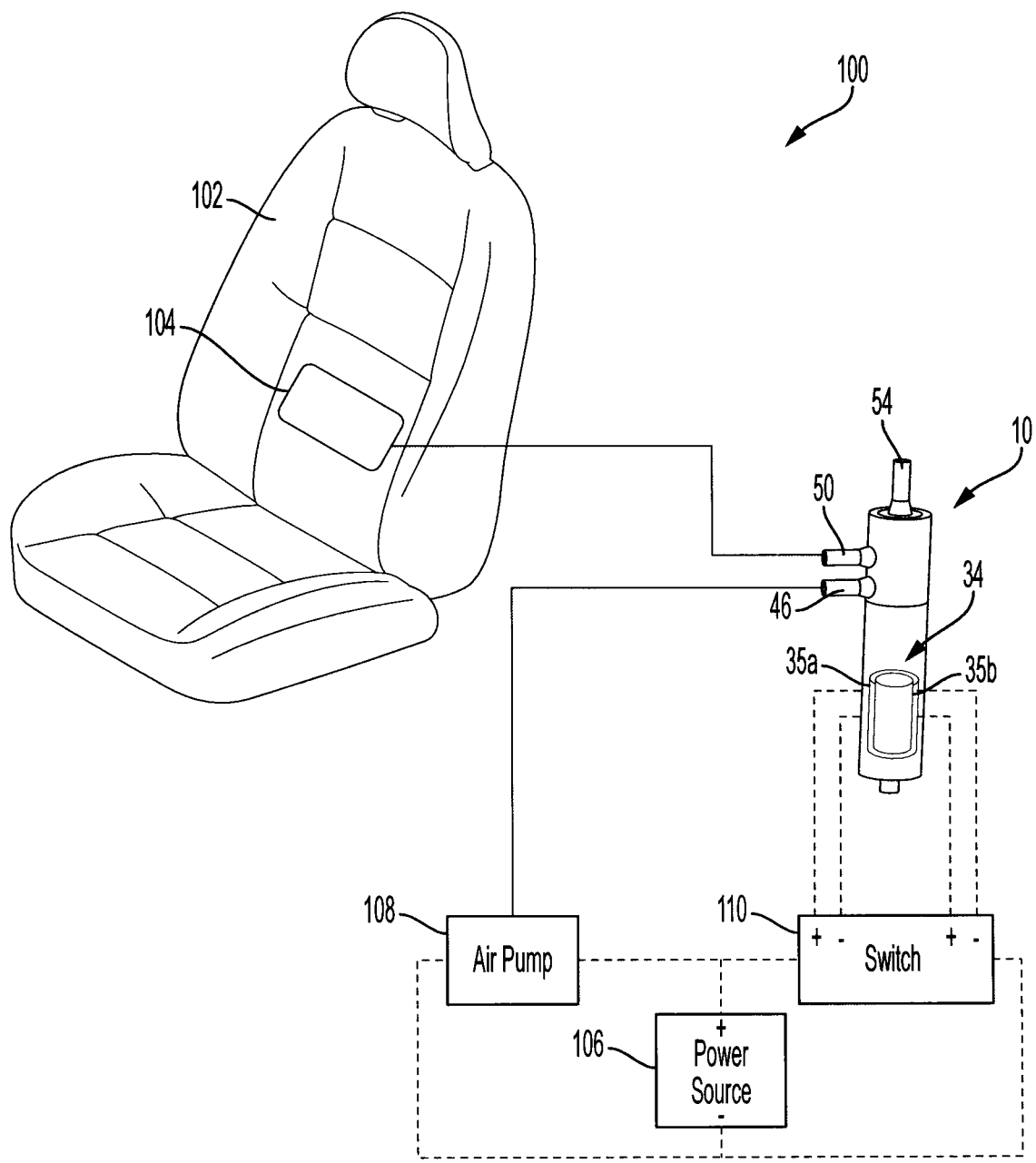
FIG. 2 is a schematic representation of a vehicle seating system including the valve of FIG. 1.
Figure 3A:
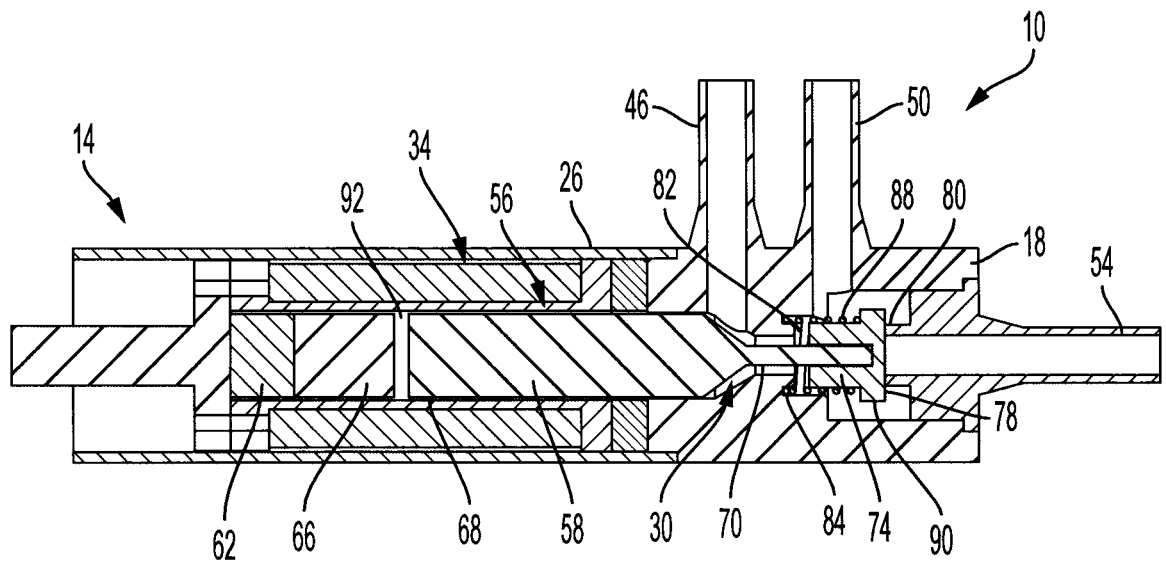
FIG. 3A is a cross-sectional view of the valve of FIG. 1 with a plunger of the valve in a first position.
Figure 3B:
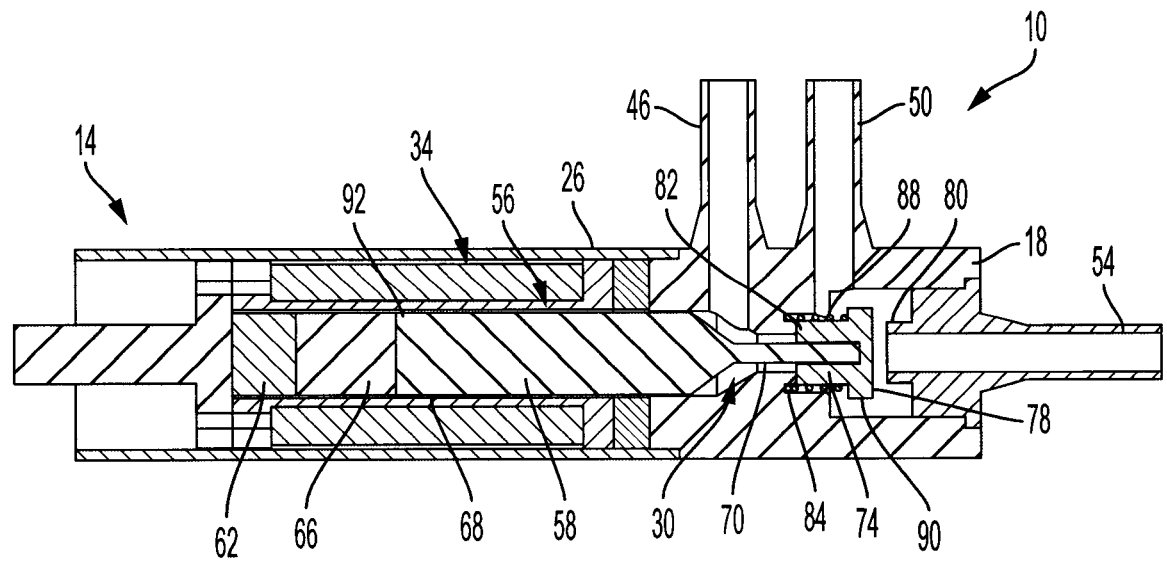
FIG. 3B is a cross-sectional view of the valve of FIG. 1 with the plunger in a second position.

Referring to FIGS. 3A and 3B, the walls 18, 22, 26 collectively define a cavity 30 within the housing 14. An electrically conductive coil assembly 34 is coupled to the side wall 26 (e.g., in a recess formed in the side wall 26), such that the coil assembly 34 is concentrically aligned with the cavity 30. In the illustrated embodiment, the coil assembly 34 is a dual coil assembly that includes two separate coils 35a, 35b made of copper, silver, gold, or any other suitable electrically conductive material (FIG. 2). The coils 35a, 35b may overlap, and the coils 35a, 35b may be wound in opposite directions. In some embodiments, the coils 35a, 35b may be integrated into a multi-layer printed circuit board ("PCB"). In such embodiments, each of the coils 35a, 35b may be formed from a plurality of spiral conductors separated by insulating lamina.

FIG. 2 illustrates an exemplary vehicle seating system 100 in which the valve 10 may be incorporated. The vehicle seating system 100 includes a seat 102, an inflatable bladder 104 disposed within the seat 102 (e.g., within a lumbar region of the seat 102), a power source 106 (e.g., a 12V or 24V power source that may be part of the electrical system of the vehicle), and an air pump 108 electrically coupled to the power source 106. As described in greater detail below, the valve 10 is operable to control inflation and deflation of the bladder 104. In some embodiments, the vehicle seating system 100 may include multiple bladders 104 and/or multiple valves 10. In addition, it should be understood that the valve 10 may be used in other applications, such as in a pneumatic massage device.

With continued reference to FIG. 2, the power source 106 is electrically coupled to the coil assembly 34 so that the power source 106 and the coil assembly 34 form a circuit in which the power source 106 is able to drive current through the coil assembly 34. In the illustrated embodiment, the power source 106 is electrically coupled to a switch 110, and the switch 110 is electrically coupled to the first coil 35*a* and the second coil 35*b*. The switch 110 has a first position or state in which the switch 110 electrically connects the power source 106 with the first coil 35*a* and a second position or state in which the switch 110 electrically connects the power source 106 with the second coil 35*b*.

The power source 106 may drive current through the first coil 35*a* in a first (e.g., positive) direction when the switch 110 is in the first position, and the power source 106 may drive current through the second coil 35*b* in a second (e.g., negative) direction when the switch 110 is in the second position. In this way, the switch 110 may be actuated between the first and second positions to reverse the magnetic field generated by the coil assembly 34, and the valve 10 can thus be used with a single-direction power source 106, which may be an existing part of the vehicle electrical system, or which may otherwise be simpler, less expensive, more efficient, and smaller in size than a bidirectional power source.

In other embodiments, the coil assembly 34 may include a single coil, and the power source 106 may be capable of selectively driving current through the coil in both a first (e.g., positive) direction and a second (e.g., negative) direction. Alternatively, the direction of current flow through the coil assembly 34 may be selectively varied using a positive to negative converter (e.g., an H-bridge), by selectively electrically coupling two different power sources 106 to the coil assembly 34, or by any other suitable means. In such embodiments, the coil assembly 34 is simplified, and the valve 10 requires fewer electrical terminals, which may make the valve 10 less costly to manufacture. Thus, the coil assembly 34 may advantageously include a single coil or multiple coils to suit a particular application of the valve 10.

The illustrated valve 10 includes three ports: a first port or pressure port 46, a second port or bladder port 50, and a third port or vent port 54. The pressure port 46 is fluidly coupled to the air pump 108 or any other source of pressurized fluid. The bladder port 50 is fluidly coupled to the bladder 104. In other embodiments, the bladder port 50 may be fluidly coupled to a downstream valve assembly or fluidic switching module configured to route the pressurized air to one or more such bladders 104. The vent port 54 is in fluid communication with the environment surrounding the valve 10. In the illustrated embodiment, the pressure port 46 and the bladder port 50 extend from the side wall 26, and the vent port 54 extends from the first end wall 18. In some embodiments, the ports 46, 50, 54 may extend from different portions of the housing 14, or the ports 46, 50, 54 may be recessed into the housing 14. In some embodiments, the ports 46, 50, 54 may be configured differently (e.g., the first port 46 may be the vent port, and the third port 54 may be the pressure port, etc.). In yet other embodiments, the valve 10 may be configured with a different number of ports (e.g., two ports, four ports, five ports, etc.) to suit a particular application.

Referring to FIGS. 3A-3B, the valve 10 includes an actuating assembly 56 with a plunger 58, a permanent magnet 62, and an iron core 66 disposed between the plunger 58 and the magnet 62. The plunger 58 is movable in an axial direction within the housing 14 between a first position (FIG. 3A) and a second position (FIG. 3B) in response to energization of the coil assembly 34. The plunger 58 includes a base 68 adjacent the iron core 66 and a nose 70 opposite the base 68. A valve element 74 is coupled to the nose 70 such that the valve element 74 is movable together with the plunger 58. The valve element 74 may be press fit on the nose 70, integral with the nose 70, or coupled to the nose 70 in any other suitable way (e.g., using adhesives, set screws, or the like).

The valve element 74 includes a first sealing surface 78 that is engageable with a first seat 80 surrounding the vent port 54 when the plunger 58 is in the first position to seal the vent port 54 (FIG. 3A). The valve element 74 further includes a second sealing surface 82 opposite the first sealing surface 78. The second sealing surface 82 is engageable with a second seat 84 to seal a passageway 86 between the pressure port 46 and the bladder port 50 when the plunger 58 is in the second position (FIG. 3B). A biasing element 88 engages a shoulder 90 of the valve element 74 between the first sealing surface 78 and the second sealing surface 82 to bias the valve element 74 and the plunger 58 toward the first position (FIG. 3A). In the illustrated embodiment, the biasing element 88 is a coil spring, but in other embodiments, the biasing element may be a disc spring, a set of repelling magnets, or any other suitable means for biasing the plunger 58 and the valve element 74 toward the first position.

The plunger 58 is made of a ferromagnetic material that interacts with the magnetic fields produced by the permanent magnet 62 and the coil assembly 34. When the plunger 58 is in the second position, the base 68 contacts the iron core 66 (FIG. 3B). The iron core 66 transmits the magnetic field from the permanent magnet 62 to the plunger 58. As such, the plunger 58 is magnetically attracted to the iron core 66. In the absence of any external forces (e.g., magnetic forces generated by the coil assembly 34), the permanent magnet 62 holds the plunger 58 in the second position against the biasing force of the biasing element 88. When the plunger 58 is moved to the first position (e.g., under the influence of magnetic forces generated by the coil assembly 34), the plunger 58 is spaced from the iron core 66 to define an air gap 92 therebetween (FIG. 3A). The air gap 92 reduces the magnetic attractive force between the magnet 62 and the plunger 58 such that the biasing force of the biasing element 88 is greater than the attractive magnetic force. In the absence of any external force (e.g., magnetic forces generated by the coil assembly 34), the biasing element 88 holds the plunger 58 in the first position. Thus, the biasing element 88 and the permanent magnet 62 latch the plunger 58 in the first position and the second position, respectively.

In operation, to inflate the bladder 104, the switch 110 is actuated to the first position to connect the power source 106 to the first coil 35*a* (FIG. 2). The power source 106 drives current through the first coil 35*a* in the first direction, which produces a first magnetic field. The first magnetic field acts on the plunger 58 with a force sufficient to overcome the magnetic attractive force of the permanent magnet 62. The plunger 58 then moves to the first position illustrated in FIG.

3A. In the first position, the first sealing surface 78 engages the first seat 80 to seal the vent port 54, and the second sealing surface 82 is moved away from the second seat 84 to provide fluid communication between the pressure port 46 and the bladder port 50. The air pump 108 then supplies pressurized air through the valve 10, which inflates the bladder 104 (FIG. 2). Because the biasing element 88 maintains the plunger 58 in the first position once the plunger 58 is actuated by the first coil 35*a*, the power source 106 need only deliver a pulse of current to inflate the bladder 104. That is, the valve 10 may remain in its inflating configuration without requiring continuous application of current through the coil assembly 34.

To deflate the bladder 104, the switch 110 is actuated to the second position to connect the power source 106 to the second coil 35*b* (FIG. 2). The power source 106 drives current through the second coil 35*b* in the second direction, which produces a second magnetic field. The second magnetic field acts on the plunger 58 with a force sufficient to overcome the biasing force of the biasing element 88. The plunger 58 then moves to the second position illustrated in FIG. 3B. In the second position, the second sealing surface 82 engages the second seat 84 to seal the passageway 86 and thereby substantially inhibit fluid communication between the pressure port 46 and the bladder port 50. In addition, the first sealing surface 78 is moved away from the first seat 80 to provide fluid communication between the bladder port 50 and the vent port 54. Pressurized air contained within the bladder 104 may thus be vented to the atmosphere via the vent port 54 to deflate the bladder 104. Because the permanent magnet 62 maintains the plunger 58 in the second position once the plunger 58 is actuated by the second coil 35*b*, the power source 106 need only deliver a pulse of current to deflate the bladder 104. That is, the valve 10 may remain in its deflating configuration without requiring continuous application of current through the coil assembly 34.

In some embodiments, the plunger 58 can be actuated between the first and second positions in response to a current pulse from the power source 106 that is between about 2 milliseconds (ms) and about 10 ms in duration. In the illustrated embodiment, the current pulse is about 3 ms in duration. The short pulse duration minimizes power drawn by the valve 10, which may be particularly advantageous when the valve 10 is incorporated into a seating assembly of a battery-powered electric vehicle, for example.

In some embodiments, the plunger 58 is movable between the first position and the second position an axial travel distance between about 0.2 millimeters (mm) and about 1.0 mm. In the illustrated embodiment, the axial travel distance of the plunger 58 is about 0.4 mm. Thus, the illustrated valve 10 can advantageously be made in a very compact size.

Figure 4:
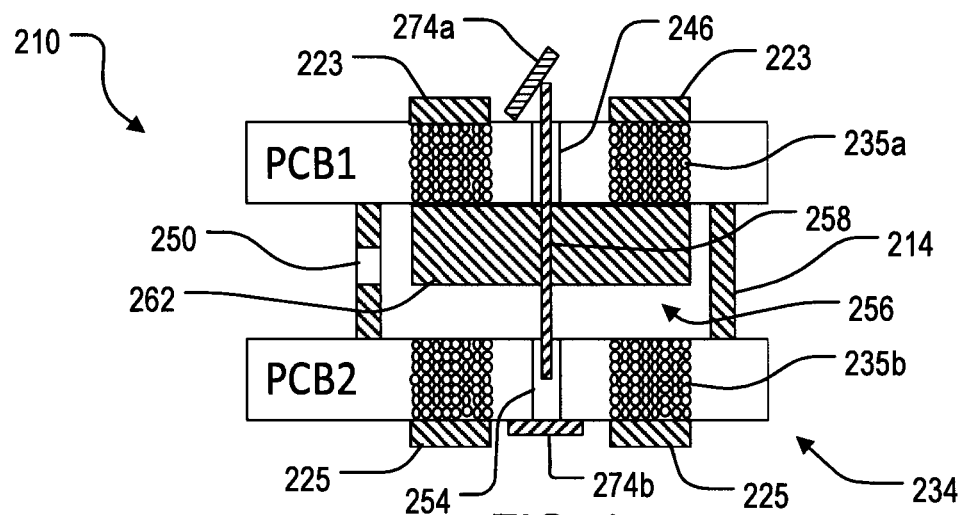
FIG. 4 is a schematic representation of a valve according to another embodiment of the present disclosure, with a plunger of the valve in a first position.
Figure 5:
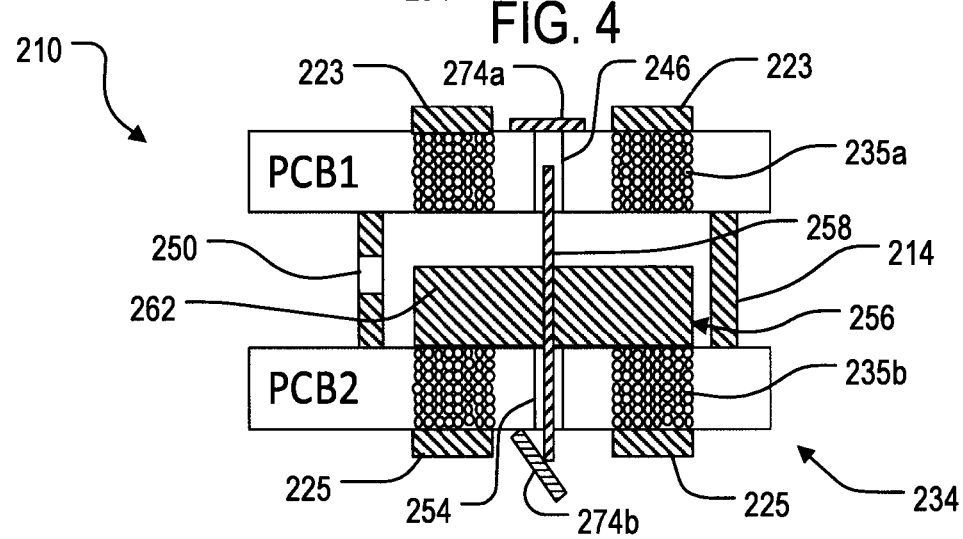
FIG. 5 is a schematic representation of the valve of FIG. 4, with the plunger in a second position.
Figure 6:
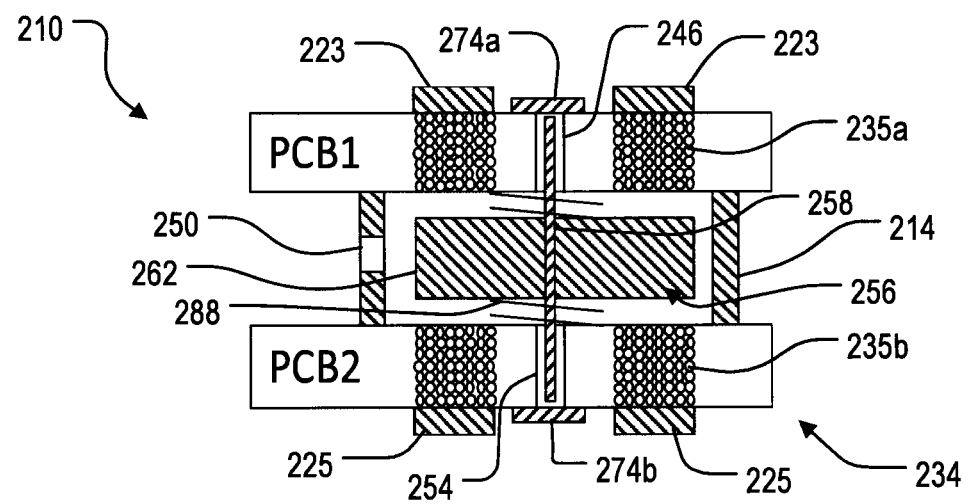
FIG. 6 is a schematic representation of the valve of FIG. 4, with the plunger in a neutral position.

FIGS. 4-6 illustrate a valve 210 according to another embodiment. The valve 210 is similar to the valve 10 described above with reference to FIGS. 1-3B and may be incorporated into the vehicle seating system 100 (FIG. 2) in a similar manner. The valve 210 may also be used in other applications. Features of the valve 210 corresponding with features of the valve 10 are given like reference numbers plus '200:' In addition, the following description focuses primarily upon differences between the valve 210 and the valve 10.

The valve 210 includes a housing 214 and an electrically conductive coil assembly 234 coupled to the housing 214. In the illustrated embodiment, the coil assembly 234 includes two separate coils 235*a*, 235*b* made of copper, silver, gold, or any other suitable electrically conductive material. In the illustrated embodiment, the coils 235*a*, 235*b* are integrated into respective first and second multi-layer printed circuit boards PCB1, PCB2. In such embodiments, each of the coils 235*a*, 235*b* may be formed from a plurality of spiral conductors separated by insulating lamina. The printed circuit boards PCB1, PCB2 are spaced apart in the illustrated embodiment, and coupled to opposite ends of the housing 214. In the illustrated embodiment, each of the printed circuit boards PCB1, PCB2 may be coupled to the housing 214 in a manner forming a substantially air-tight seal therebetween.

The illustrated valve 210 includes three ports: a first port or pressure port 246, a second port or bladder port 250, and a third port or vent port 254. The pressure port 246 extends through the first printed circuit board PCB1 to an interior of the housing 214. The pressure port 246 may be fluidly coupled to the air pump 108 (FIG. 2) or any other source of pressurized fluid. The bladder port 250 may be fluidly coupled to the bladder 104 (FIG. 2). In other embodiments, the bladder port 250 may be fluidly coupled to a downstream valve assembly or fluidic switching module configured to route the pressurized air to one or more such bladders 104. The vent port 254 extends through the second printed circuit board PCB2 to an interior of the housing 214. The vent port 254 is in fluid communication with the environment surrounding the valve 210. In some embodiments, the ports 246, 250, 254 may be configured differently (e.g., the first port 246 may be the vent port, and the third port 254 may be the pressure port, etc.). In yet other embodiments, the valve 210 may be configured with a different number of ports (e.g., two ports, four ports, five ports, etc.) to suit a particular application.

The illustrated valve 210 includes an actuating assembly 256 with a plunger 258 and a permanent magnet 262 fixed to the plunger 258 for movement therewith. The actuating assembly 256 is movable in an axial direction within the housing 214 between a first position (FIG. 4) and a second position (FIG. 5) in response to energization of the respective first and second coils 235*a*, 235*b*. The plunger 258 engages a first valve element 274*a* to open the pressure port 246 when the actuating assembly 256 is in the first position (FIG. 4), and the opposite end of the plunger 258 engages a second valve element 274*b* to open the vent port 254 when the actuating assembly 256 is in the second position (FIG. 5). The valve elements 274*a*, 274*b* are biased towards a closed position in which the valve elements 274*a*, 274*b* seal the respective ports 246, 254.

The permanent magnet 262 interacts with the magnetic fields produced by the coil assembly 234 to move the actuating assembly 256 between the first and second positions. One or more ferromagnetic elements 223, 225 is provided on each of the first and second printed circuit boards PCB1, PCB2. In the illustrated embodiment, the ferromagnetic elements 223, 225 are disposed on the outer sides of the respective printed circuit boards PCB1, PCB2 (i.e., outside the housing 214). In other embodiments, the ferromagnetic elements 223, 225 may be disposed on the inner sides of the printed circuit boards PCB1, PCB2 (i.e., inside the housing 214). In some embodiments, the ferromagnetic elements 223, 225 may be fixed to the printed circuit boards PCB1, PCB2 using surface mount technology.

When the actuating assembly 256 is in the first position (FIG. 4), the permanent magnet 262 is positioned adjacent the first printed circuit board PCB1. The permanent magnet 262 is attracted to the ferromagnetic elements 223, thereby retaining the actuating assembly 256 in the first position. Likewise, when the actuating assembly 256 is in the second position (FIG. 5), the permanent magnet 262 is positioned adjacent the second printed circuit board PCB2. The magnet 262 is attracted to the ferromagnetic elements 225, thereby retaining the actuating assembly 256 in the second position. Accordingly, the permanent magnet 262 is configured to latch the actuating assembly 256 in each of the first position and the second position, respectively, such that the actuating assembly 256 may remain in each of the first position and the second position when the coil assembly 234 is de-energized.

In operation, to move the actuating assembly 256 from the first position (FIG. 4) to the second position (FIG. 5), the first coil 235a is energized to produce a first magnetic field. The first magnetic field acts on the permanent magnet 262 with a force sufficient to overcome the magnetic attractive force of the permanent magnet 262 and the ferromagnetic elements 225. The actuating assembly 256 then moves to the second position illustrated in FIG. 5. In other embodiments, the second coil 235b may be energized to move the actuating assembly 256 toward the second position, or both coils 235a, 235b may be used to move the actuating assembly 256. In the second position, the plunger 258 engages the second valve element 274b to open the vent port 254. The permanent magnet 262 maintains the actuating assembly 256 in the second position, such that only a brief pulse of current through the first coil 235a is needed to actuate the valve 210.

Conversely, to move the actuating assembly 256 from the second position (FIG. 5) to the first position (FIG. 4), the second coil 235b is energized to produce a second magnetic field. The second magnetic field acts on the permanent magnet 262 with a force sufficient to overcome the magnetic attractive force of the permanent magnet 262 and the ferromagnetic elements 223. The actuating assembly 256 then moves to the first position illustrated in FIG. 4. In other embodiments, the first coil 235a may be energized to move the actuating assembly 256 toward the first position, or both coils 235a, 235b may be used to move the actuating assembly 256. In the first position, the plunger 258 engages the first valve element 274a to open the pressure port 246. The permanent magnet 262 maintains the actuating assembly 256 in the first position, such that only a brief pulse of current through the second coil 235b is needed to actuate the valve 210.

With reference to FIG. 6, in some embodiments, the actuating assembly 256 may also be movable to a third or neutral position, which is an intermediate position between the first and second positions. To move to the neutral position, both coils 235a, 235b may be energized. In the neutral position, the plunger 258 is spaced from valve elements 274a, 274b, such that the pressure port 246 and vent port 254 are both closed. In the illustrated embodiment, centering springs 288 are provided to bias the actuating assembly 256 toward the neutral position. The centering springs 288 are of sufficient strength to maintain the actuating assembly 256 in the neutral position when the coils 235a, 235b are de-energized. In other embodiments, other means such as stops or detents may be provided to retain the actuating assembly 256 in the neutral position.

Thus, the illustrated valve 210 is able to provide multiple latching positions. The short pulse duration minimizes power drawn by the valve 210, which may be particularly advantageous when the valve 210 is incorporated into a seating assembly of a battery-powered electric vehicle, for example. In addition, by providing two coils 235a, 235b, the valve can advantageously be operated using a one directional power supply. Alternatively, the coils 235a, 235b can each be operated to produce magnetic fields in different directions by reversing the polarity of the power supply. Finally, incorporating the coils 235a, 235b in printed circuit boards PCB1, PCB2 allows the valve 210 to be smaller in size, lower in cost, and easier to assemble than conventional solenoid valves. Other components that may be provided with the valve 210, such as control electronics (e.g., a microprocessor), switches, and the like, may be attached to either or both of the printed circuit boards PCB1, PCB2 using surface mount technology, thereby simplifying assembly of the valve 210.

Figure 7:
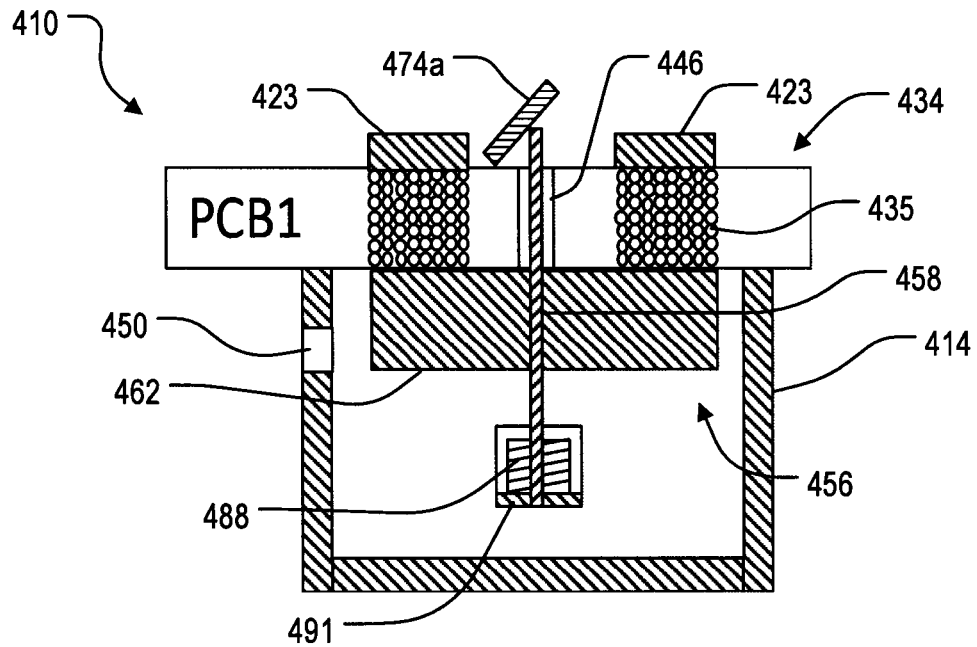
FIG. 7 is a schematic representation of a valve according to another embodiment of the present disclosure, with a plunger of the valve in a first position.
Figure 8:
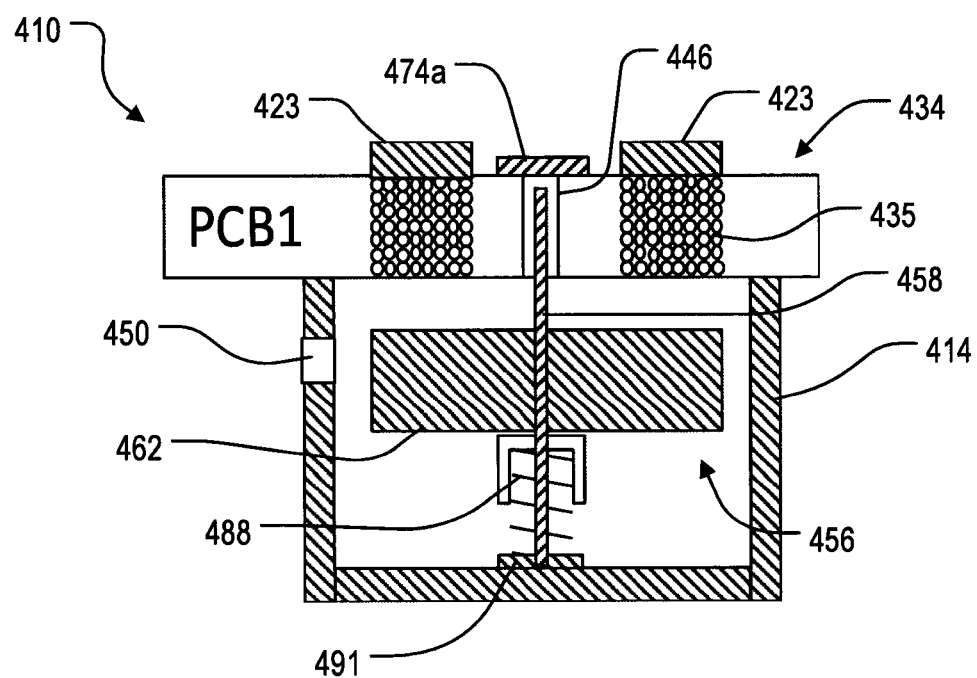
FIG. 8 is a schematic representation of the valve of FIG. 7, with the plunger in a second position.

FIGS. 7-8 illustrate a valve 410 according to another embodiment. The valve 410 is similar to the valve 210 described above with reference to FIGS. 4-6 and may likewise be incorporated into the vehicle seating system 100 illustrated in FIG. 2. The valve 410 may also be used in other applications. Features of the valve 410 corresponding with features of the valve 210 are given like reference numbers plus '200.' In addition, the following description focuses primarily upon differences between the valve 410 and the valve 210.

The valve 410 includes a housing 414 and an electrically conductive coil assembly 434 coupled to the housing 414. Instead of including multiple coils and printed circuit boards like the valve 210 described above, the coil assembly 434 of the valve 410 includes a single coil 435 integrated into a multi-layer printed circuit board PCB1. In addition, the illustrated valve 410 includes only two ports: a first port or pressure port 446 extending through the printed circuit board PCB1 and a second port or bladder port 450.

The illustrated valve 410 includes an actuating assembly 456 with a plunger 458 that is movable in an axial direction within the housing 414 between a first position (FIG. 7) and a second position (FIG. 8). A permanent magnet 462 is coupled to the plunger 458 for movement therewith relative to the housing 414. The plunger 458 engages a first valve element 474a to open the pressure port 246 when the actuating assembly 458 is in the first position (FIG. 7), and the plunger 458 is spaced from the first valve element 474a to allow the first valve element 474a to close when the actuating assembly 456 is in the second position (FIG. 8). The valve element 474a is biased towards a closed position in which the valve element 474a seals the port 446.

One or more ferromagnetic elements 423 is provided on the printed circuit boards PCB1. In the illustrated embodiment, the ferromagnetic elements 423 are disposed on the outer side of the printed circuit board PCB1 (i.e., outside the housing 414). In other embodiments, the ferromagnetic elements 423 may be disposed on the inner side of the printed circuit board PCB1 (i.e., inside the housing 414). In the illustrated embodiment, the plunger 458 includes a flange portion 491 that engages an end of a biasing member 488 (e.g., a coil spring). The biasing member 488 acts against the flange portion 491 to bias the actuating assembly 456 toward the second position (FIG. 8) and away from the ferromagnetic elements 423.

In operation, to move the actuating assembly from the first position (FIG. 7) to the second position (FIG. 8), the coil 435 is energized to produce a magnetic field. The magnetic field acts on the permanent magnet 462 with a force sufficient to overcome the magnetic attractive force of the permanent magnet 462 and the ferromagnetic elements 423. The actuating assembly 456 then moves to the second position illustrated in FIG. 8 with assistance from the biasing member 488, and the valve element 474a closes. The biasing member 488 then maintains the actuating assembly 456 in the second position, such that only a brief pulse of current through the coil 435 is needed to actuate the valve 410.

Conversely, to move the actuating assembly from the second position (FIG. 8) to the first position (FIG. 7), the coil 435 is energized in an opposite (i.e. negative) direction to produce a second magnetic field. The second magnetic field acts on the magnet 462 with a force sufficient to overcome the biasing force of the biasing member 488. The actuating assembly 456 then moves to the first position illustrated in FIG. 7. In the first position, the plunger 458 engages the first valve element 474a to open the pressure port 446. The attraction between the permanent magnet 462 and the ferromagnetic elements 423 then retains the actuating assembly 456 in the first position, such that only a brief pulse of current through the coil 435 is needed to actuate the valve 410.

Thus, the illustrated valve 410 is able to provide multiple latching positions. The short pulse duration minimizes power drawn by the valve 410, which may be particularly advantageous when the valve 410 is incorporated into a seating assembly of a battery-powered electric vehicle, for example. Finally, incorporating the coil 435 in a printed circuit board PCB1 allows the valve 410 to be smaller in size, lower in cost, and easier to assemble than conventional solenoid valves. Other components that may be provided with the valve 410, such as control electronics (e.g., a microprocessor), switches, and the like, may be attached to the printed circuit board PCB1 using surface mount technology, thereby simplifying assembly of the valve 410.

Figure 9:
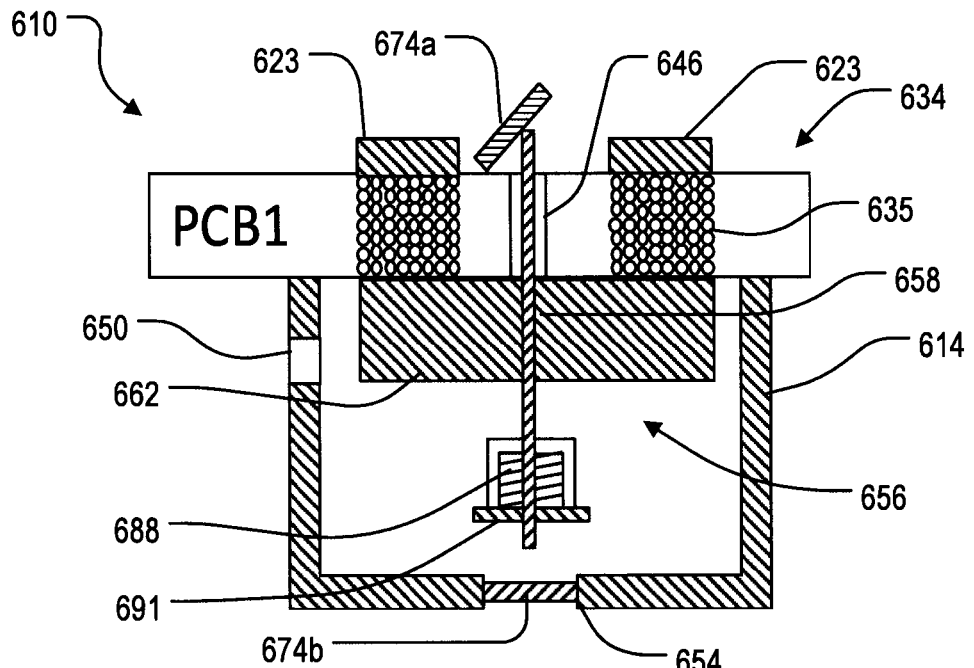
FIG. 9 is a schematic representation of a valve according to another embodiment of the present disclosure, with a plunger of the valve in a first position.
Figure 10:
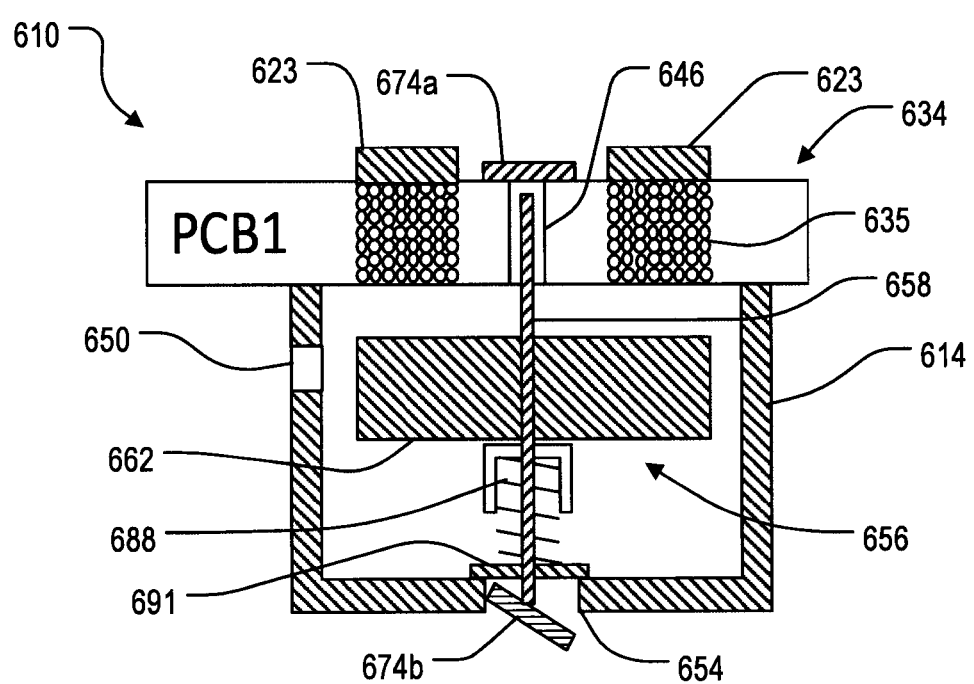
FIG. 10 is a schematic representation of the valve of FIG. 9, with the plunger in a second position.

FIGS. 9-10 illustrate a valve 610 according to another embodiment. The valve 610 is similar to the valve 410 described above with reference to FIGS. 7-8 and may likewise be incorporated into the vehicle seating system 100 illustrated in FIG. 2. The valve 610 may also be used in other applications. Features of the valve 610 corresponding with features of the valve 410 are given like reference numbers plus '200:' In addition, the following description focuses primarily upon differences between the valve 610 and the valve 410.

Like the valve 410 described above, the valve 610 includes a single coil 635 integrated into a single printed circuit board PCB1. Instead of two ports, however, the valve 610 includes a first or pressure port 646, a second or bladder port 650, and a third or vent port 654 opposite the pressure port 646. The actuating assembly 656 of the valve 610 functions in a similar manner to the actuating assembly 456 of the valve 410, except the plunger 458 is configured to engage a second valve element 674b when the actuating assembly 656 is in the second position to open the vent port 654.

Various features and aspects of the invention are set forth in the following claims.

What is claimed is:

1. A pneumatic valve comprising:
a housing;
a first port, a second port, and a third port, each in communication with an interior of the housing;
a coil assembly coupled to the housing;
a plunger axially movable within the housing between a first position and a second position in response to electrical current being driven through the coil assembly, wherein the plunger extends longitudinally along a first direction, wherein one of the first port, the second port, or the third port extends along a second direction coaxial with the first direction, and wherein another of the first port, the second port, or the third port extends along a third direction transverse to the first direction;
a permanent magnet configured to retain the plunger in at least one of the first position or the second position; and
a single valve sealing element attached to the plunger so as to move with the plunger, wherein the single valve sealing element is configured to (i) open fluid communication between the first port and the second port and close fluid communication between the second port and the third port in the first position, and open fluid communication between the second port and the third port and close fluid communication between the first port and the second port in the second position.

2. The pneumatic valve of claim 1, wherein the permanent magnet is configured to retain the plunger in the first position, and wherein the pneumatic valve further comprises a biasing element configured to retain the plunger in the second position.

3. The pneumatic valve of claim 1, further comprising a first ferromagnetic element and a second ferromagnetic element, each fixed relative to the housing.

4. The pneumatic valve of claim 3, wherein the permanent magnet is configured to retain the plunger in the first position by magnetic attraction between the permanent magnet and the first ferromagnetic element.

5. The pneumatic valve of claim 4, wherein the permanent magnet is configured to retain the plunger in the second position by magnetic attraction between the permanent magnet and the second ferromagnetic element.

6. The pneumatic valve of claim 5, wherein the permanent magnet is coupled to the plunger for movement therewith relative to the housing.

7. The pneumatic valve of claim 1, wherein the coil assembly includes a first coil and a second coil.

8. The pneumatic valve of claim 7, wherein the first coil is integrated into a first PCB, and wherein the second coil is integrated into a second PCB spaced from the first PCB.

9. The pneumatic valve of claim 7 wherein the first coil at least partially overlaps the second coil.

10. The pneumatic valve of claim 1, further comprising an iron core positioned between the permanent magnet and the plunger.

11. The pneumatic valve of claim 10, wherein the plunger abuts the iron core in the second position.

12. A pneumatic valve comprising:
a housing;
a first port in communication with an interior of the housing;
a coil assembly coupled to the housing;
a plunger axially movable within the housing between a first position and a second position in response to electrical current being driven through the coil assembly;
a permanent magnet attached to the plunger so as to move with the plunger between the first position and the second position, wherein the permanent magnet is configured to retain the plunger in at least one of the first position or the second position; and
a first ferromagnetic element coupled to the housing and a second ferromagnetic element coupled to the housing and spaced from the first ferromagnetic element magnet, wherein the first ferromagnetic element is positioned to cooperate with the permanent magnet to retain the plunger in the first position and the second ferromagnetic element is positioned to cooperate with the permanent magnet to retain the plunger in the second position,
wherein the plunger is configured to open the first port when the plunger is in the first position, and wherein the first port is configured to be closed when the plunger is in the second position.

13. The pneumatic valve of claim 12, wherein the coil assembly includes a first printed circuit board and a first coil integrated into the first printed circuit board.

14. The pneumatic valve of claim 13, wherein the coil assembly includes a second printed circuit board and a second coil integrated into the second printed circuit board, wherein the plunger is axially movable toward the first position in response to electrical current being driven through the first coil or the second coil, and wherein the plunger is axially movable toward the second position in response to electrical current being driven through the other of the first coil or the second coil.

15. The pneumatic valve of claim 14, wherein the second ferromagnetic element is positioned opposite the first ferromagnetic element.

16. The pneumatic valve of claim 12, further comprising a second port and a third port, wherein the third port is positioned opposite the first port, and wherein the plunger is configured to open the third port when the plunger is in the second position.

17. The pneumatic valve of claim 16, wherein the plunger is movable to a neutral position in which the first port and the third port are closed.

18. The pneumatic valve of claim 17, further comprising at least one centering spring configured to retain the plunger in the neutral position when the coil assembly is de-energized, and wherein the neutral position is between the first position and the second position.

19. A vehicle seating system comprising:
a seat;
an inflatable bladder disposed within the seat;
a power source;
an air pump electrically coupled to the power source; and
a valve operable to control inflation and deflation of the bladder, wherein the valve comprises:
   a housing including
      a pressure port fluidly coupled to the air pump,
      a bladder port fluidly coupled to the inflatable bladder, and
      a vent port,
   a coil assembly coupled to the housing and electrically coupled to the power source,
   a plunger axially movable within the housing between the pressure port and the vent port in response to electrical current being driven through the coil assembly, wherein the plunger extends longitudinally along a first direction, wherein one of the pressure port, the bladder port, or the vent port extends along a second direction coaxial with the first direction, and wherein another of the pressure port, the bladder port, or the vent port extends along a third direction transverse to the first direction, and
   a permanent magnet configured to retain the plunger in at least one of a first position or a second position,
wherein the plunger is configured to open fluid communication between the pressure port and the bladder port and close fluid communication between the bladder port and the vent port when the plunger is in the first position, and
wherein the plunger is configured to open fluid communication between the bladder port and the vent port and close fluid communication between the pressure port and the bladder port when the plunger is in the second position.

\* \* \* \* \*